U. E. LEMON.
Bag-Holders.
No. 158,849.
Patented Jan. 19, 1875.
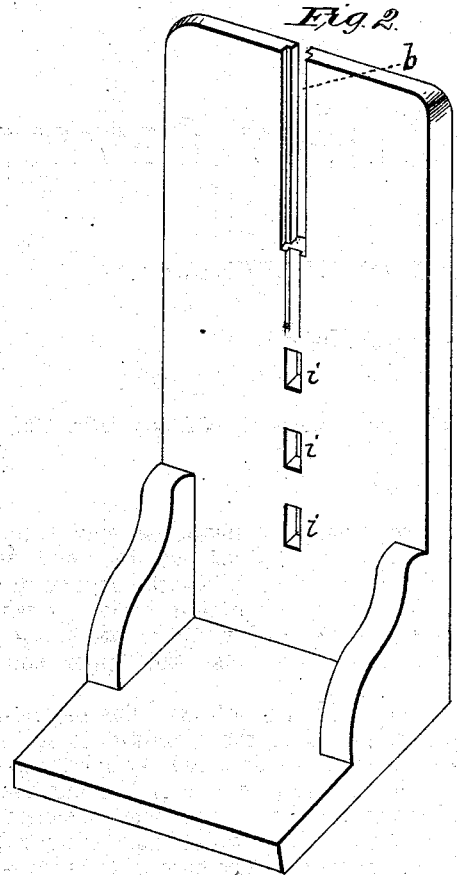
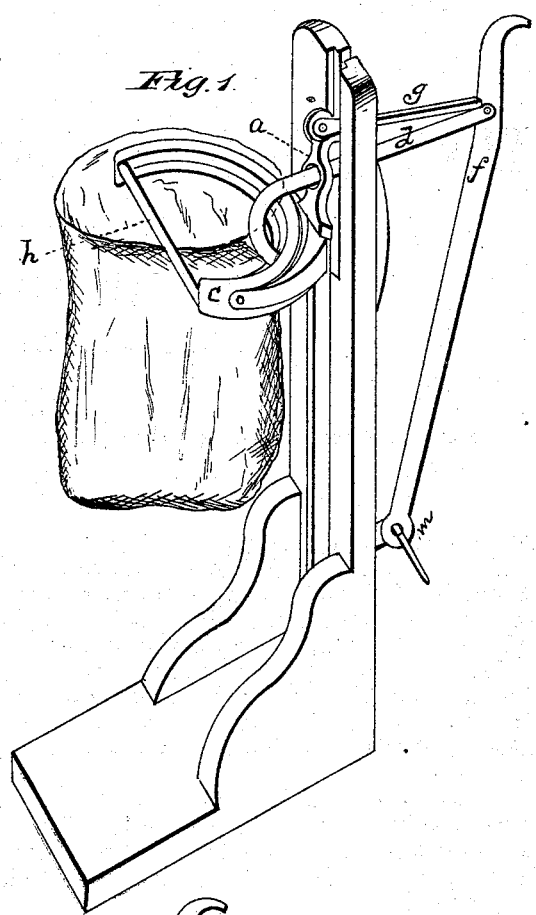
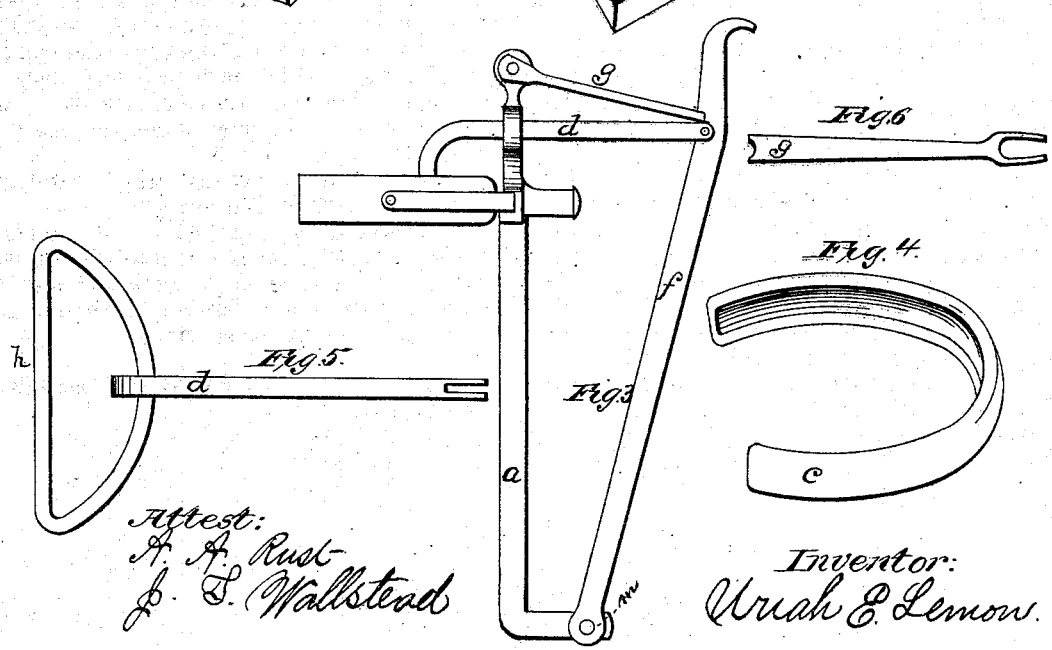
Attest:
H. A. Rust
J. S. Wallstead
Inventor:
Uriah E. Lemon

UNITED STATES PATENT OFFICE.

URIAH E. LEMON, OF FRANKLIN, MICHIGAN.

IMPROVEMENT IN BAG-HOLDERS.

Specification forming part of Letters Patent No. 158,849, dated January 19, 1875; application filed September 29, 1874.

*To all whom it may concern:*

Be it known that I, URIAH E. LEMON, of Franklin, Oakland county, Michigan, have invented an Improvement in Bag-Holders, of which the following is a specification:

The object of my invention is to facilitate the filling of bags with grain; and consists in the combination of devices, as will be hereinafter more fully described, and pointed out in the claim.

In the accompanying drawing, Figure 1 is a perspective view of the bag-holder; Fig. 2, a perspective view of the standard with bag-holding devices detached; Figs. 3, 4, 5, and 6, detail views.

A is the wooden standard, to which the bag-holding devices are secured, and is provided with mortises $i\ i\ i$, into any one of which the lower end of bar $a$ is inserted, and secured therein by the lever $f$ and pin $m$, as clearly shown in Fig. 1. Said bar $a$, near its upper end, has a horizontally-projecting shank, to which is attached a T-shaped head, the shank arranged to slide in the groove $b$ in the standard, and the head serving to hold the bar $a$ from displacement as the bar is adjusted up or down in the mortises $i$. On the opposite side of the bar $a$ is rigidly attached the grooved semicircular bar $c$, into which fits the D-shaped iron bar $h$, which is hinged to lever $f$ by shank $d$ passing through a hole in the upper end of bar $a$. The bar $h$ can be moved away from bar $c$ by means of lever $f$, to admit the mouth of the bag over the bar $h$, after which it is drawn back into the groove in bar $c$, and held securely therein by pawl $g$, which is hinged to the upper end of bar $a$, and arranged to bear against the upper end of lever $f$.

The operation is as follows: The bag-holder is first adjusted in the standard to suit the size of the bag to be filled by inserting the lower end of bar $a$ in one of the mortises $i$. The lever $f$ and bar $a$ are then secured together by the pin $m$, which also secures the bar in the mortise. The pawl $g$ is then raised, which allows the bar $h$ to be moved away from the bar $c$. The mouth of the bag is then placed over the bar $h$, which is then drawn back by the lever $f$ into the groove of the bar $c$, and held securely by the pawl, when the bag is in a condition to be filled.

What I claim as my invention, and desire to secure by Letters Patent, is—

The D-shaped iron bar $h$ and grooved semi-circular bar $c$, with bar $a$, mortised and grooved standard A, and lever $f$, combined and arranged to operate substantially in the manner as and for the purpose specified.

URIAH E. LEMON.

Witnesses:
 A. A. RUST,
 JAS. WALSTEAD.